Patented Nov. 21, 1922.

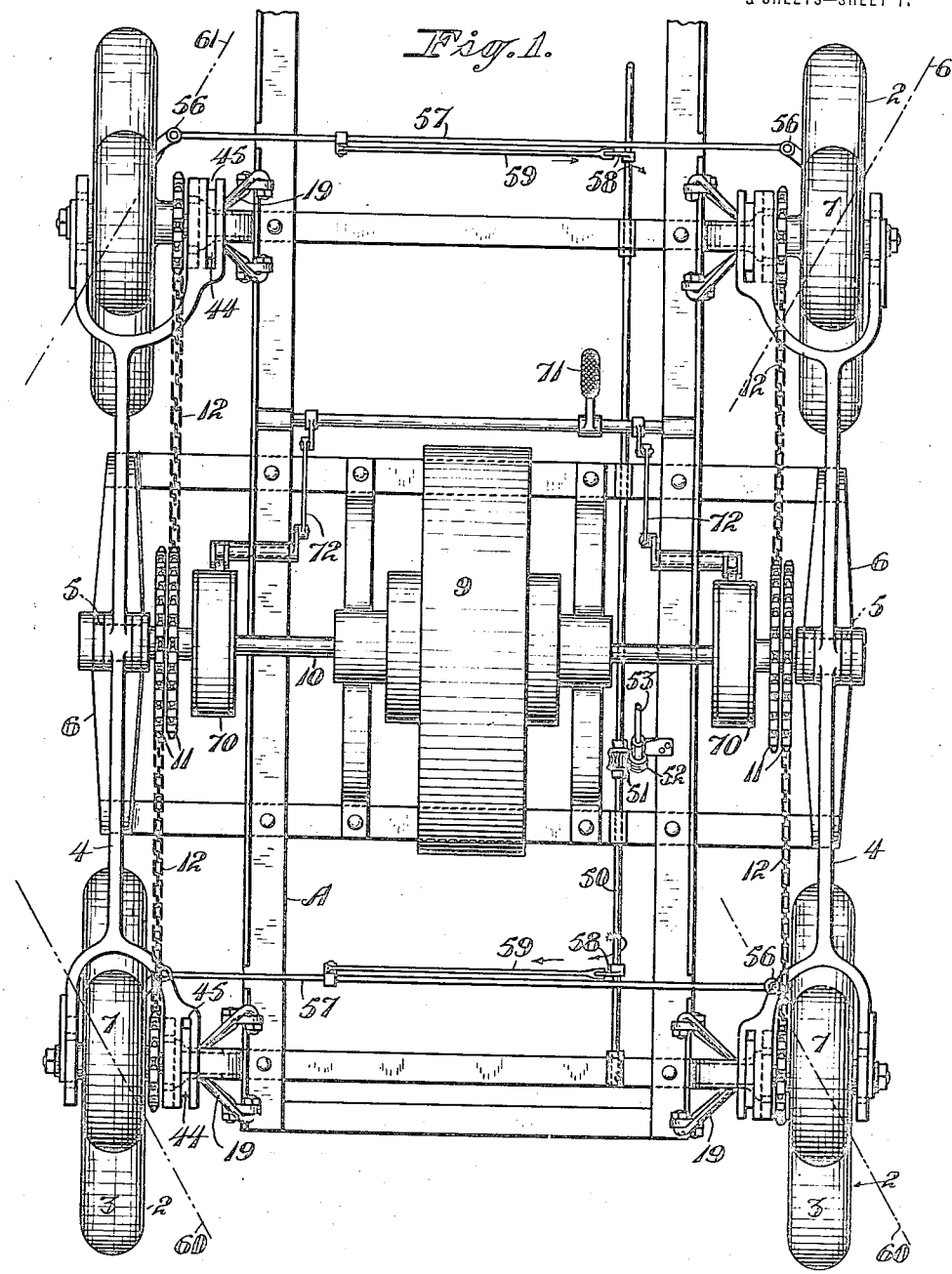

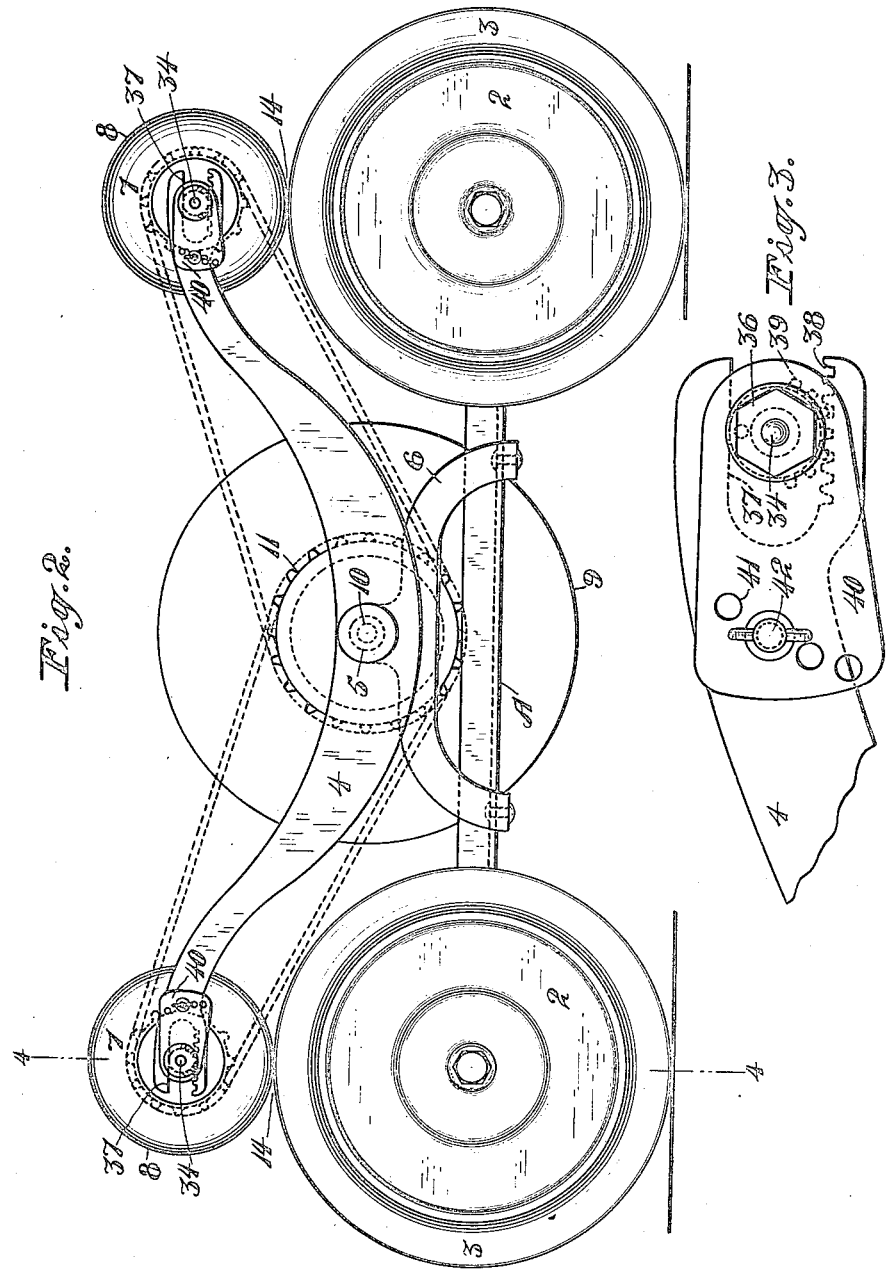

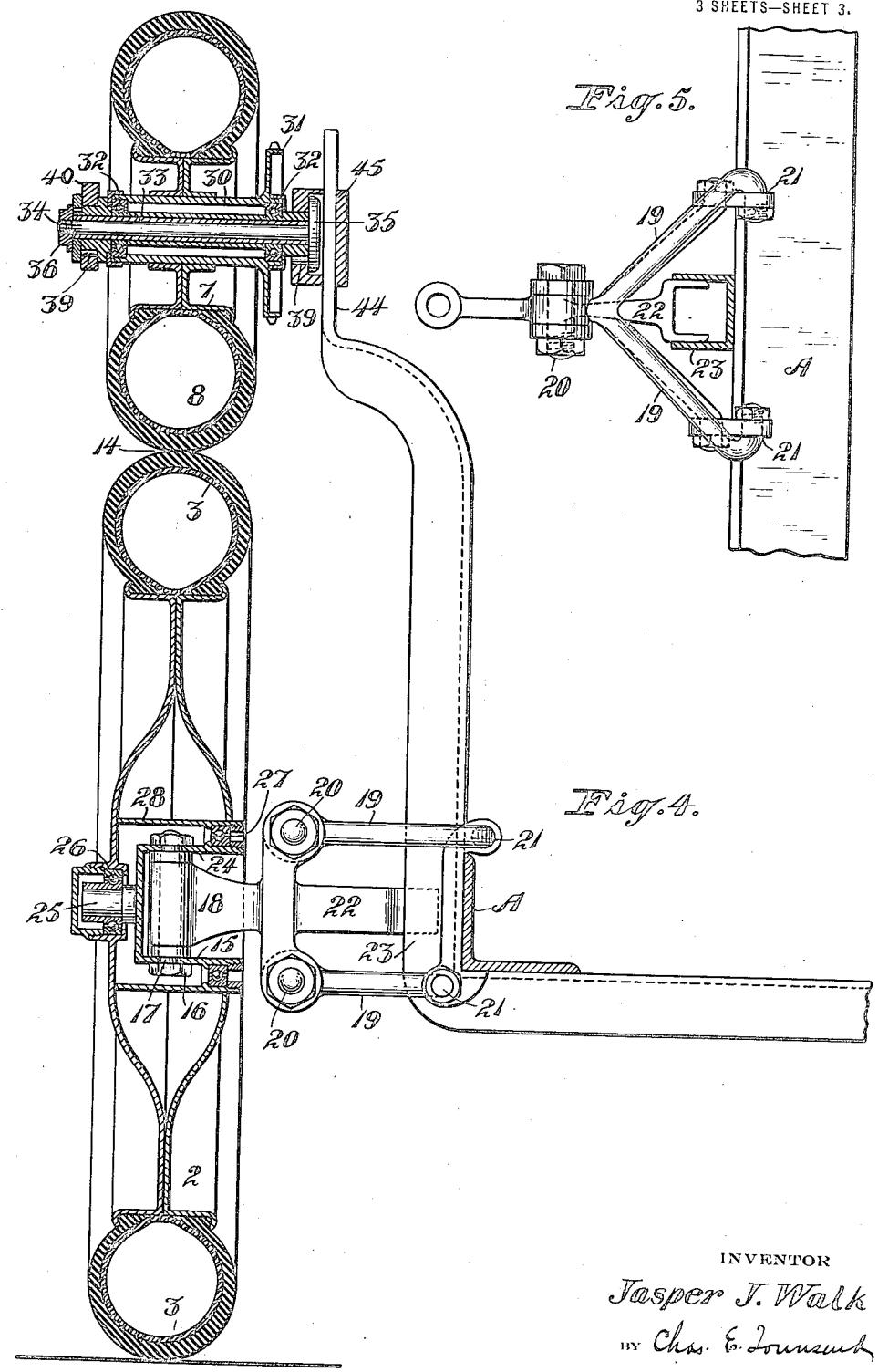

1,436,373

UNITED STATES PATENT OFFICE.

JASPER J. WALK, OF OAKLAND, CALIFORNIA.

VEHICLE MOUNTING AND DRIVE.

Application filed February 11, 1920. Serial No. 357,934.

*To all whom it may concern:*

Be it known that I, JASPER J. WALK, a citizen of the United States, residing at Oakland, in the county of Alameda and State of California, have invented a new and useful Improvement in Vehicle Mountings and Drives, of which the following is a specification.

This invention relates to a vehicle mounting and drive.

One of the objects of the present invention is to provide a novel pneumatic mounting or support for the main frame of a motor vehicle or the like and more especially to provide a mounting which is supported or rests directly upon the wheels with which the vehicle is equipped.

Another object of the invention is to provide a four-wheel drive and particularly a friction drive.

Further objects will hereinafter appear.

The invention consists of the parts and the construction, combination and arrangement of parts as hereinafter more fully described and claimed, having reference to the accompanying drawings, in which—

Fig. 1 is a plan view of the vehicle.

Fig. 2 is a side elevation of the same.

Fig. 3 is an enlarged detail view of one of the driving wheel journals.

Fig. 4 is an enlarged central vertical section on line 4—4 of Fig. 2.

Fig. 5 is a detail plan view showing one of the main wheel supports and the fork-shaped tie rods whereby said supports are connected with the main frame.

Referring to the drawings in detail, A indicates the main frame and 2 a plurality of wheels by which said frame is supported. These wheels may be constructed in any suitable manner, but are preferably equipped with pneumatic tires as indicated at 3. The main frame A is hung from a pair of rocker arms 4, disposed one on each side of the main frame, these rocker arms being pivotally connected as at 5 to hangers 6 which extend cross-wise of the main frame to support the same. The rocker arms 4 are provided with journal members at their outer ends and each journal member carries a wheel 7 which is directly supported by the main wheels 2. The wheels 7 are also preferably provided with pneumatic tires as at 8 and a pneumatic support is in this manner formed for the main frame, to-wit, the tires 3 and the tires 8. The wheels 7 serve two important functions, first that of supporting the main frame with relation to the wheels 2, and secondly that of frictionally transmitting power to the wheels 2. This is accomplished in the following manner:

Suitably supported on the main frame or on the hangers 6, extending cross-wise thereof, is a motor or engine 9 of suitable construction. The shaft 10 of this engine extends cross-wise of the frame and passes directly through the pivotal connections 5 formed between the rocker arms 4 and the hangers 6. A pair of sprocket wheels 11 are secured on each end of this shaft and power is transmitted from said sprocket wheels to the respective wheels 7 by means of chains 12. A four-wheel friction drive is in this manner obtained as each wheel 7 forms a driver with relation to its supporting wheel 2 and an ideal pneumatic support for the main frame is at the same time obtained as a pneumatic cushion is first formed between each wheel 2 and the ground and two pneumatic cushions are formed between the hangers 4 and the wheels 2, due to the contact of the pneumatic tires 3 and 8 at the points indicated at 14. A minimum amount of vibration should in this manner be transmitted to the main frame, and springs or the like may of course be positively eliminated.

The main supporting wheels 2 are not rigidly attached to the main frame, but merely pivotally connected thereto to permit a free movement of the main frame. This feature of the structure will be more readily understood when referring to Figs. 4 and 5. Each wheel 2 consists of a central hub member 15 which is attached as at 16 to a vertical pivot 17. This pivot is carried by a centrally disposed bracket member 18 which is connected with the main frame A by means of a pair of fork-shaped links 19. These links are placed one above the other and interspaced as shown, and are pivotally attached to the bracket 18 as at 20. They are also pivotally attached to the main frame as at 21. These links permit a free up and down movement of the wheels 2 with relation to the main frame and they, at the same time, secure the wheels against lateral movement with relation to the main frame, and furthermore against forward or rearward movement with relation to the main frame, the forward and rearward movement being taken care of both by the fork-shaped links 19 and a central extension 22 on the bracket 18 which enters and is guided by a channel shaped member 23 secured to the main frame.

From this description it can be seen that an up and down movement of each main supporting wheel 2, with relation to the main frame, is permitted, but that the wheels are positively secured against forward or rearward movement, or against lateral movement. To permit the formation of the pivotal connection 17, it is necessary to form a hollow hub as shown at 24. This hub passes over the bracket member 18 and it permits a swinging movement of the wheels 2 with relation to the brackets 18, this being necessary to permit steering of the vehicle as will hereinafter be described. The hollow hub 24 carries a spindle 25 and a ball bearing 26, thereby partially supporting the wheel 2, and it also carries a second ball bearing 27 which forms a support for the inner side of the wheel. The hub 24 is secured against revolution, but an exterior hub 28, formed on the wheel, is free to revolve as it is supported entirely by the spindle 25 and the ball bearings 26 and 27.

The wheels 7, by which the main frame is supported, are clearly illustrated in Figs. 3 and 4. Each of these wheels consists of a hub member 30, on which is secured a sprocket gear 31. The hub 30 is supported by ball bearings 32, disposed at each end thereof and these are in turn supported on a sleeve member 33, through which extends a bolt 34. The outer ends of the respective rocker arms 4 are fork-shaped as shown in Fig. 1. The sleeve 33 and the bolt 34 extend through the fork-shaped ends of the respective rocker arms and are secured therein by a head member 35 and a nut 36. The respective supporting wheels 7 are locked against lateral movement as they are secured between the forks of the rocker arms, but they are adjustable longitudinally thereof to take up any slack which might form in the driving sprocket chains 12. This is accomplished in the following manner:

The forks on the rocker arms 4 are slotted as at 37, (See Figs. 2 and 3) and the lower sides of said slots are provided with rack teeth 38. Formed on the sleeve 33 are gear teeth 39 which mesh with the rack teeth 38, and secured to each sleeve 33 is a plate 40. These plates are perforated as at 41 at their inner ends and a bolt and a thumb screw is adapted to pass through said perforations to secure the plate 40 and the sleeve against movement as indicated at 42. The plates 40 really serve as lever arms whereby turning movement may be transmitted to the sleeves. This turning movement will cause the gear teeth 39 on the respective sleeves to advance or to be retracted when engaging the racks 38 and it is therefore possible to slack or tighten the respective driving chains 12. When adjustment has been obtained, it is only necessary to insert the bolt and apply the thumb screw 42. This positively secures the plates 40 and permanent adjustment is thereby attained.

As previously stated lateral movement of the wheels 7 with relation to the main frame is taken care of by the fork-shaped ends of the rocker arms 4, and longitudinal movement of the wheels with relation to the forks or the rocker arms is regulated and adjusted by the gears 39, the racks 38 and the securing plates 40. Lateral movement of the wheels is further taken care of by a vertically disposed guide member 44. There is one guide member for each fork and this guide member passes upwardly between a secondary fork 45, formed on the inner side of each main fork. (See Fig. 1). A rigid structure is in this manner obtained which at the same time permits free vertical movement of the wheels with relation to the main frame or vice versa, and perfect alignment between the wheels and centering of the same is also maintained.

The vehicle is steered in the following manner:

Extending longitudinally of the main frame is a shaft 50, and secured on said shaft is a worm gear 51, which meshes with a worm 52, secured on the steering column 53. Turning movement of the steering column transmits a turning movement to the shaft 50, due to the transmission provided by means of the gears 51 and 52. This movement is in turn transmitted to steer the vehicle, and this is accomplished as follows:

Forming an extension on each hub member 24 is a steering knuckle arm 56. These arms are connected by tie rods 57, and these tie rods are actuated by the shaft 50 by means of crank arms 58 and links 59. Both the front and rear wheels are similarly connected, but the link connection 59, between the crank arms 58 and the tie rods 57, is such, that when a turning movement is transmitted to shaft 50, the front wheels will turn, for instance in the direction indicated by dotted lines 60, while the rear wheels will turn into the dotted line position shown at 61. This is a decided advantage as it permits turning of comparatively sharp corners. The wheels 7 always maintain the same position, but as they engage the center upper portion of the wheels 2, it is obvious that these may be turned to any position desired.

While I have here described a steering mechanism which permits opposed turning of the front and rear wheels, it is obvious that the front wheels alone may be turned if desired, as the steering mechanism merely forms a minor part of the present invention.

Any suitable form of braking mechanism may be employed, but preferably as shown a pair of brake drums 70. These drums are mounted directly on the main engine shaft 10 and are actuated by a brake pedal 71 and the connected links indicated at 72. This feature is also of minor importance and may be changed to suit varying conditions.

From the foregoing description it should be obvious that a vehicle has been provided, in which the main frame is pneumatically supported, and that said pneumatic support is formed between the main frame and the pneumatic tires with which the wheels of the vehicle are equipped; further that a four-wheel friction drive is formed between the wheels 7 and the main supporting wheels 2, thus materially increasing the traction power of the vehicle without in any way affecting the steering ability of the same. There are two important advantages obtained, first, an easy riding vehicle, due to the peculiar mounting of the main frame, and secondly a novel form of drive which materially increases the traction ability of the vehicle.

Having thus described my invention, what I claim and desire to secure by Letters Patent is—

1. In a vehicle, a plurality of supporting wheels, a main frame, longitudinally extending arms supporting wheels at their ends, the said wheels being in engagement with the supporting wheels, the said main frame being pivotally suspended from the arms.

2. In a vehicle a plurality of supporting wheels, pneumatic tires on said wheels, a main frame, rocker arms pivotally connected thereto, a plurality of wheels on the rocker arms engaging the pneumatic tires on the first named wheels and supporting the main frame, pneumatic tires on said supporting wheels, and means carried by the main frame for transmitting power through the supporting wheels to the first named wheels.

3. In a vehicle a plurality of supporting wheels, a main frame, centrally pivoted and longitudinally extending rocker arms carried by said frame, a plurality of wheels attached to the rocker arms engaging the periphery of the first named wheels and supporting the main frame with relation thereto, and means for securing the first named wheels against lateral or longitudinal movement with relation to the main frame, said means permitting free vertical movement of the first named wheels with relation to the main frame.

4. In a vehicle a plurality of supporting wheels, a main frame, centrally pivoted and longitudinally extending rocker arms attached to the main frame, a plurality of wheels attached to the rocker arms engaging the periphery of the first named wheels and supporting the main frame, and means for securing the first named wheels against lateral or longitudinal movement with relation to the main frame, said means permitting arcuate movement of the first named wheels with relation to the main frame.

5. In a vehicle a plurality of supporting wheels, a main frame, centrally pivoted and longitudinally extending rocker arms carried by the main frame, a plurality of wheels attached to the rocker arms engaging the periphery of the first named wheels and supporting the main frame with relation thereto, means for securing the first named wheels against lateral or longitudinal movement with relation to the main frame, said means permitting arcuate movement of the wheeds in a vertical direction with relations to the main frame, and means permitting longitudinal adjustment of said wheels with relation to the main frame and the first named wheels.

6. In a vehicle a plurality of supporting wheels, a main frame, a rocker arm on each side of the main frame, a central pivotal connection between each rocker arm and the main frame, and a wheel journalled at each end of each rocker arm, said wheels engaging the periphery of the first named wheels and supporting the main frame with relation thereto.

7. In a vehicle a plurality of supporting wheels, a main frame, a rocker arm on each side of the main frame, a central pivotal connection between each rocker arm and the main frame, a wheel journalled at each end of each rocker arm, said wheels engaging the periphery of the first named wheels and supporting the main frame with relation thereto, and means carried by the main frame for transmitting power to rotate the second named wheels to permit said second named wheels to frictionally transmit power to the first named wheels.

8. In a vehicle a plurality of supporting wheels, a main frame, a rocker arm on each side of the main frame, a central pivotal connection between each rocker arm and the main frame, a wheel journalled at each end of each rocker arm, said wheels engaging the periphery of the first named wheels and supporting the main frame with relation thereto, means carried by the main frame for transmitting power to rotate the second named wheels to permit said second named wheels to frictionally transmit power to the first named wheels, and pneumatic tires on all wheels to form a pneumatic cushion support for the main frame.

9. In a vehicle a plurality of supporting wheels, a main frame, a rocker arm on each side of the main frame, a central pivotal connection between each rocker arm and the main frame, a wheel journalled at each end of each rocker arm, said wheels engaging the periphery of the first named wheels and supporting the main frame with relation thereto, means carried by the main frame for transmitting power to rotate the second named wheels to permit said second named wheels to frictionally transmit power to the first named wheels, and means for securing the first named wheels against lateral and longitudinal movement with relation to the main frame, said means permitting a free vertical movement of said wheels.

10. In a vehicle a plurality of supporting wheels, a main frame, a rocker arm on each side of the main frame, a central pivotal connection between each rocker arm and the main frame, a wheel journalled at each end of each rocker arm, said wheels engaging the periphery of the first named wheels and supporting the main frame with relation thereto, means carried by the main frame for transmitting power to rotate the second named wheels to permit said second named wheels to frictionally transmit power to the first named wheels, means for securing the first named wheels against lateral and longitudinal movement with relation to the main frame, said means permitting a free vertical movement of said wheels, and means permitting longitudinal adjustment of the second named wheels with relation to the rocker arms and the first named wheels.

11. In a vehicle a plurality of supporting wheels, a main frame, a rocker arm on each side of the main frame, a central pivotal connection between each rocker arm and the main frame, a wheel journalled at each end of each rocker arm, said wheels engaging the periphery of the first named wheels and supporting the main frame with relation thereto, means carried by the main frame for transmitting power to rotate the second named wheels to permit said second named wheels to frictionally transmit power to the first named wheels, means for securing the first named wheels against lateral and longitudinal movement with relation to the main frame, said means permitting a free vertical movement of said wheels, means permitting longitudinal adjustment of the second named wheels with relation to the rocker arms and the first named wheels, and pneumatic tires on all wheels to form a pneumatic support for the main frame.

12. In a vehicle a plurality of supporting wheels, a main frame having rocker arms pivotally connected thereto, a plurality of wheels attached to and journalled at the ends of the rocker arms, said wheels engaging the periphery of the first named wheels and supporting the main frame, and means for frictionally transmitting power from the second named wheels to the first named wheels.

13. A vehicle comprising a main frame having running wheels mounted thereon in a manner permitting limited vertical movement and controlled horizontally arcuate swinging movement, a pair of longitudinal arms pivotally connected to said frame, and wheels mounted adjacent the ends of said arms and in engagement with the first named wheels for supporting the main frame.

14. A vehicle comprising a main frame having running wheels mounted thereon in a manner permitting a limited vertical movement and a controlled horizontal arcuate swinging movement, a pair of longitudinal arms pivotally connected at approximately their center to said frame, supporting and driving wheels mounted adjacent the outer ends of said arms and in frictional engagement with said running wheels for supporting the main frame, and means for imparting rotating movement to said supporting wheels so as to impart motion to the driving wheels.

In testimony whereof I have hereunto set my hand in the presence of two subscribing witnesses.

JASPER J. WALK.

Witnesses:
W. W. HEALEY,
M. E. ERVING.